Figure 1:
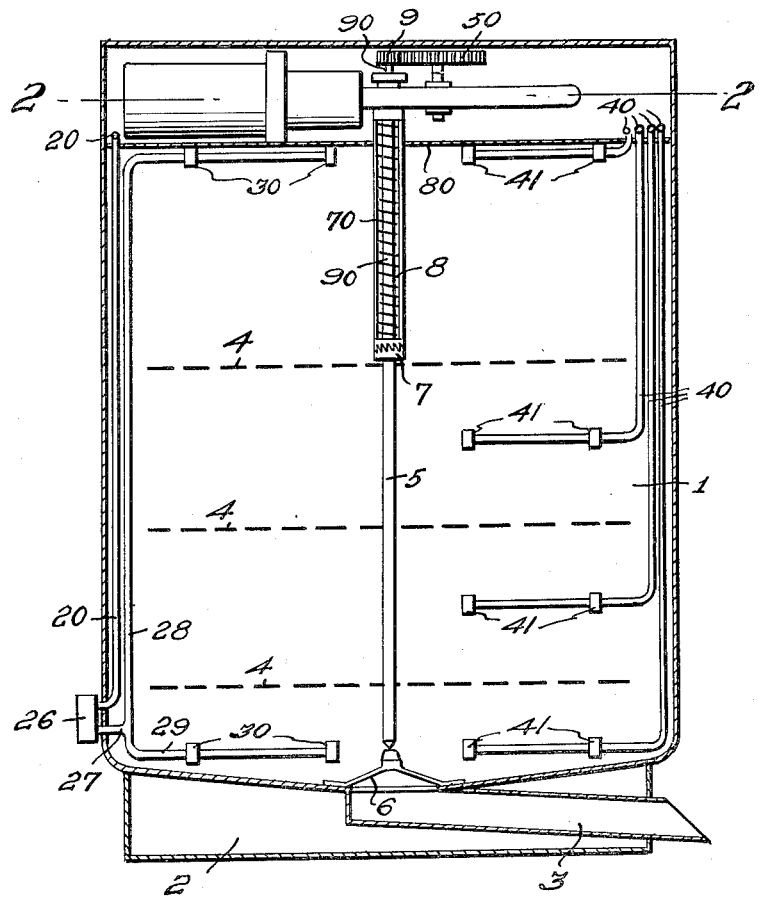

Jan. 15, 1952   J. HERTZ   2,582,543
LIQUID CONTROL ARRANGEMENT FOR WASHING MACHINES
Filed March 8, 1946   4 Sheets-Sheet 1

INVENTOR.
Jorgen Hertz
BY
Attorneys.

Jan. 15, 1952        J. HERTZ        2,582,543

LIQUID CONTROL ARRANGEMENT FOR WASHING MACHINES

Filed March 8, 1946        4 Sheets-Sheet 2

INVENTOR.
Jorgen Hertz
BY
Attorneys.

Jan. 15, 1952 J. HERTZ 2,582,543
LIQUID CONTROL ARRANGEMENT FOR WASHING MACHINES
Filed March 8, 1946 4 Sheets-Sheet 3
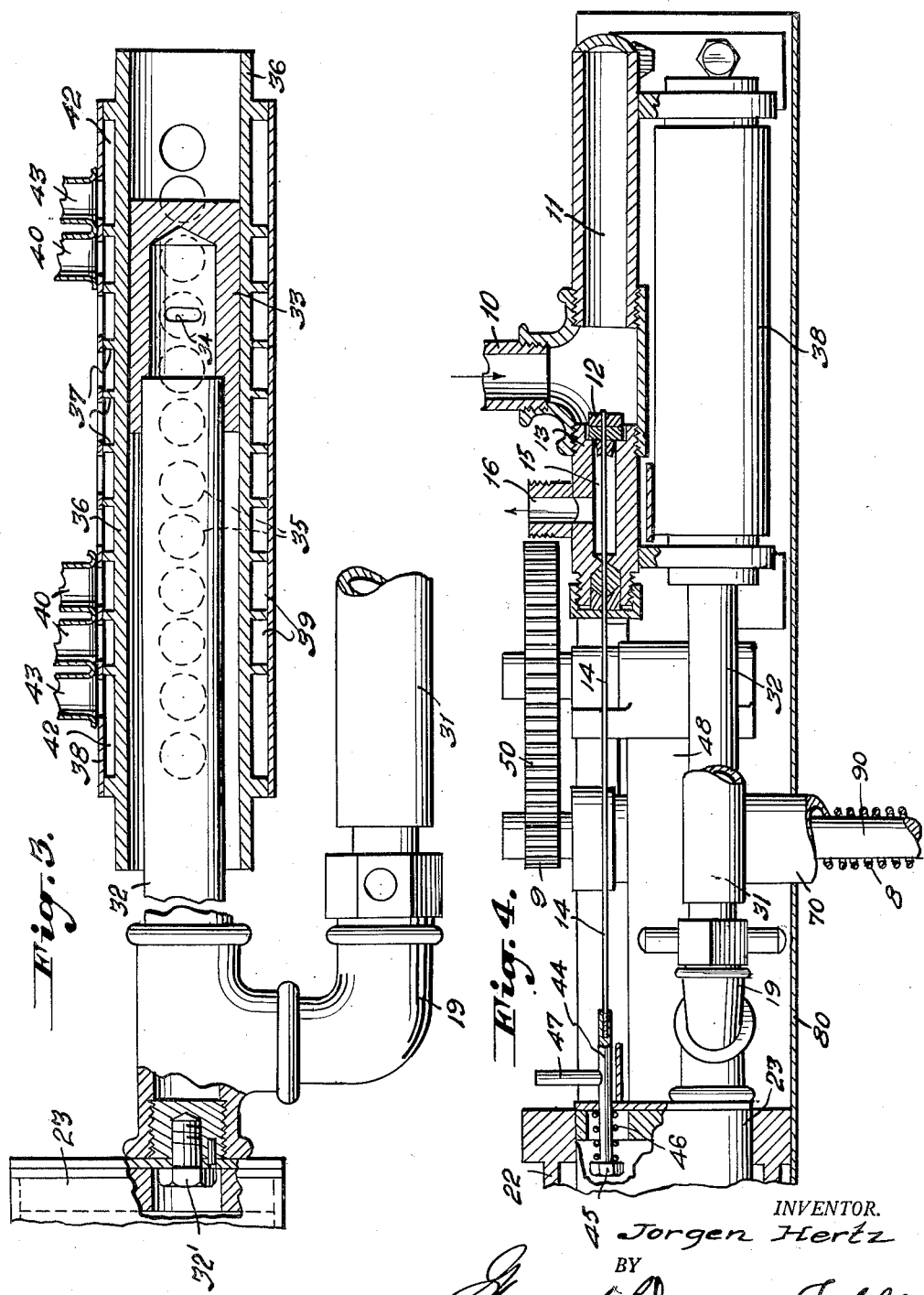
INVENTOR.
Jorgen Hertz
BY
Attorneys.

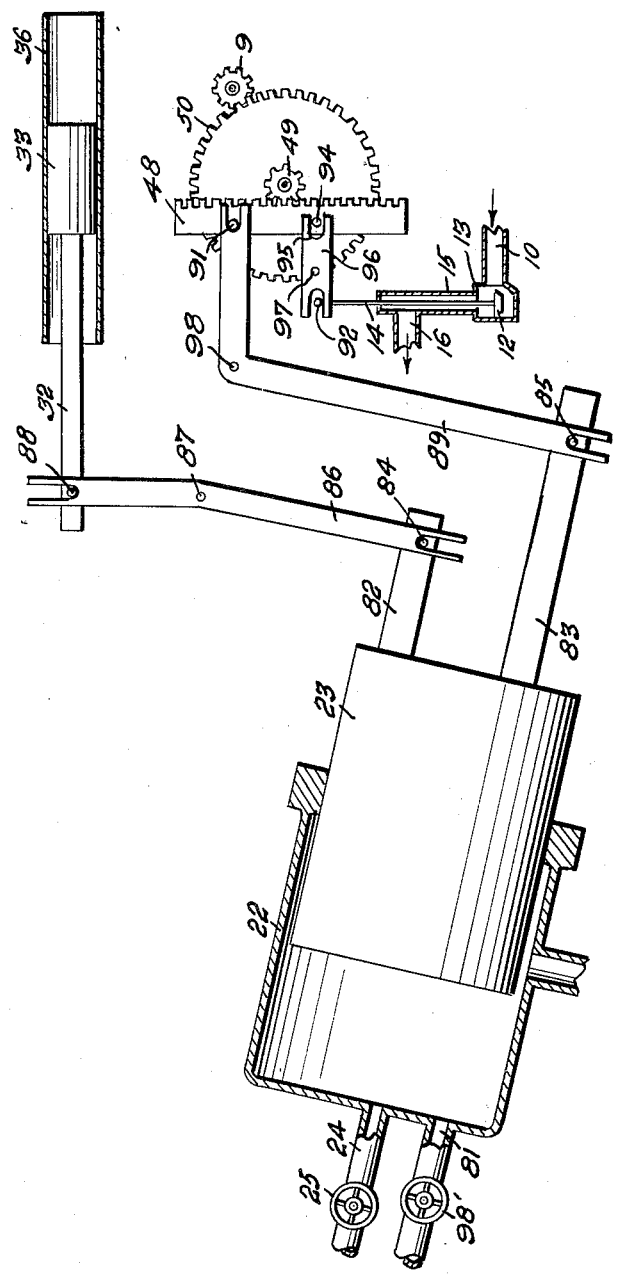

Patented Jan. 15, 1952

2,582,543

UNITED STATES PATENT OFFICE 2,582,543

LIQUID CONTROL ARRANGEMENT FOR WASHING MACHINES

Jörgen Hertz, Copenhagen, Denmark

Application March 8, 1946, Serial No. 653,001
In Sweden March 28, 1945

4 Claims. (Cl. 137—139)

From Patent No. 2,372,205 dish-washing machines are known with a number of liquid outlet openings, e. g. nozzles or groups of such nozzles, through which a liquid—e. g. a cleaning liquid or a rinsing liquid or another suitable kind of liquid—is squirted out under the pressure from a water pipe, and in which machines the liquid outlet openings for the particular liquid are made active periodically by means of a liquid control arrangement consisting of a piston- or slide-arrangement in combination with a cylinder or a similar wall, the said two parts of the liquid control arrangement having a relative motion in the wholly or partly longitudinal direction and being shaped with liquid passage openings, which during the said relative motion are brought to correspond successively.

The present invention relates to a liquid control arrangement for a dish-washing machine which may be of the same kind as the machine mentioned above, and in which the two parts of the liquid control arrangements are of an especially advantageous construction.

More clearly defined the invention relates to a liquid control arrangement for a dish-washing machine, especially for household purposes, of the kind having a plurality of liquid squirting openings, e. g. nozzles or nozzle groups, through which a liquid—e. g. cleaning liquid or rinsing liquid or liquid of another kind—is squirted out, the said liquid squirting openings being made periodically active by being fed from a liquid control arrangement with two parts that are wholly or partly movable longitudinally in relation to each other, one of which parts has a slight number, e. g. only one or a couple, of liquid outlets, and the other has a plurality of liquid passage openings, which during the relative motion of the two parts are periodically brought to correspond with the liquid outlet or liquid outlets on the former part.

The feature that is the first and foremost characteristic of the invention is that a movable part of the liquid control arrangement and a piston, which is movable in a container, form independent parts, and furthermore that the said movable part of the liquid control arrangement is moved on account of a motion of the piston, and finally that the motion of the piston in the outward direction in relation to the container is in a way known per se effected at any rate mainly by a liquid pressure in the container, while the return motion of the piston is caused either by a driving arrangement or by a returning force or by both.

The invention furthermore relates to various details in a liquid control arrangement for the dish-washing machine here referred to.

In the drawings have been shown what is necessary for understanding the invention.

Fig. 1 shows a partly schematical vertical central section through an embodiment of a dish-washing machine in accordance with the invention.

Figure 2:
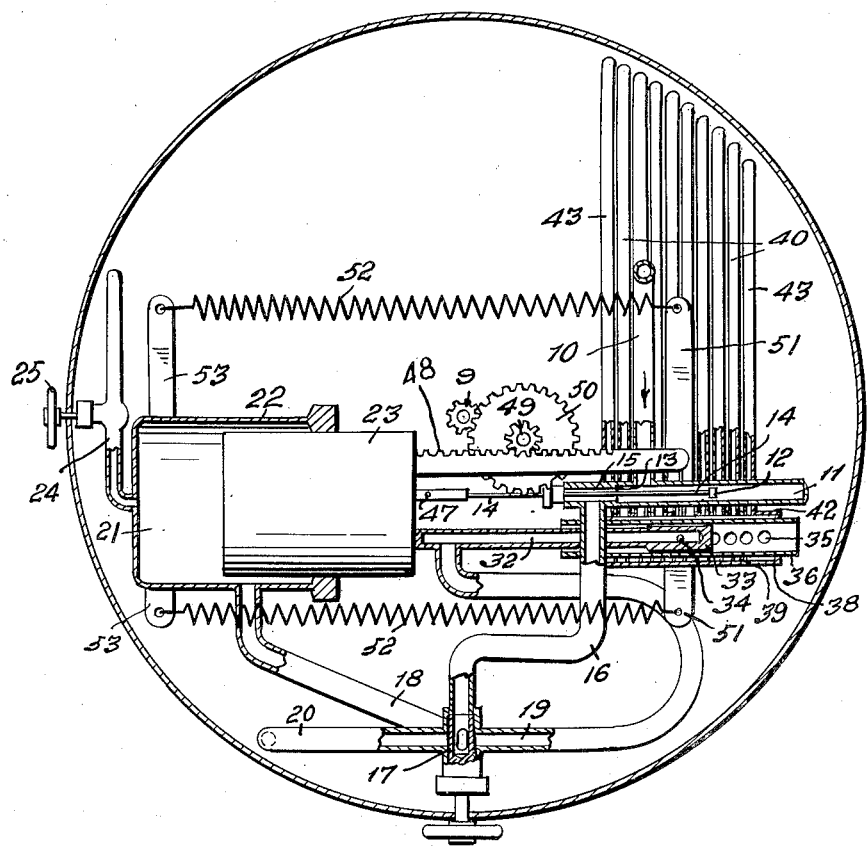

Fig. 2 on a larger scale shows a horizontal section on line 2—2 in Fig. 1.

Fig. 3 on a still larger scale shows the liquid control arrangement of the machine in section.

Fig. 4 likewise on a larger scale shows the liquid control arrangement in side elevation and a section through part of the supply pipe for the driving pressure liquid and a valve fitted in the pipe part, the closing of which valve is effected from the piston.

Fig. 5 schematically and partly in section shows a modified embodiment of the driving arrangement for the main members of the machine said driving arrangement being driven from the piston.

I in Fig. 1 designates the dish-washing space or chamber of the machine, which chamber I has a bottom part 2 with a drain 3. The chamber I is accessible through doors or shutters and contains one or more shelves or corresponding parts which form a carrying frame 4 or other suitable supporting means for the dishes. In the embodiment shown the carrying frame 4 is movably mounted, being carried by a vertical spindle 5 which can be caused to rotate. The lower end of the spindle 5 is mounted in a foot piece 6 which is placed over the outlet opening from the chamber I, while the upper end of the spindle 5 carries the lower part of a claw coupling 7 or a similar coupling mechanism. The upper part of the coupling is carried by an upper spindle part 90 situated in continuation of the spindle 5, which spindle part 90 in the vicinity of its two ends is journalled in a tubular case 70 which is rigidly connected to, e. g., the upper wall 80 of the chamber I. Between the case 70 and the upper spindle part 90 journalled therein a helical spring 8 is fitted which encloses the spindle part and the lower end of which is secured to the latter, while the upper end of the spring is attached to the tubular case 70. On the top end of the upper spindle part 90 a gear 9 is mounted. When, as will be explained in the following, the gear 9 is turned by the piston 23 shown in Fig. 2 moving outwards, the spring 8, Fig. 1, will be tensioned while at the same time the upper part of the coupling 7 together with the upper spindle part 9ϑ rotate, while the spindle 5 and the lower part of the coupling 7 remain immovable together with the carrying frame 4 and the dishes placed upon it. The tensioned spring 8 will during the return motion of the piston 23, Fig. 2, which will be referred to later, act to turn the spindle 5 and the carrying frame 4, which rotatory motion will also be assisted by the springs 52 shown in Fig. 2, which springs 52 will be mentioned later.

The horizontal wall 9ϑ above the chamber 1 serves for bounding a space which contains the liquid control arrangement of the machine.

The dish-washing machine shown is built with such a pipe system that the machine is operated by water under pressure which may be supplied either from a special pump or from a house water main. The water is supplied through a supply pipe 10, Fig. 2, which is connected to a chamber 11 closed at its outer end, and in which a valve 12 may move, which valve 12 can close a valve seat 13. The valve spindle 14, as shown in Figs. 2 and 4, passes, through packing, out of the inner end of the chamber 11. Between this end and the valve seat 13 the valve spindle 14 is disposed concentrically in a tubular passage 15 from which leads a pipe 16, through which the water under pressure supplied through the pipe 10 is led to the three-way cock 17 shown in Fig. 2 when the valve 12 is open. The three-way cock 17 can be set so as to supply water under pressure to any one of the three pipes 18, 19, and 20 connected with the cock 17. The pipe 18 connects with a pressure chamber 21 formed by a cylindrical container 22 which is closed by a piston 23 movable therein. From the pressure chamber 21 in the container 22 leads a drain pipe 24 with a regulating valve 25. The drain pipe 24 may continue vertically down through the chamber 1, Fig. 1, and end below at the bottom of the latter, so that liquid flowing off through the pipe 24 is supplied to the drain 3.

The pipe 20 from the three-way cock 17 may be seen in part in Fig. 2, in part in Fig. 1, which show that at its lower end the pipe 20 connects with a container 26. The container 26 may contain a water-soluble cleaning medium, e. g., in the form of a cartridge placed in the container 26. From the container 26 a pipe 27 leads to several branch pipes 28 and 29. The pipes 28 and 29 are provided with ejection nozzles 30 for cleaning liquid or groups of such nozzles or other corresponding liquid exhaust openings, through which cleaning liquid may be injected into the chamber 1. The pipe 19 from the three-way cock 17 may consist of a flexible portion, or there may be connected to the pipe 19 a rubber hose, as indicated by the hose 31 in Fig. 3. The pipe 19 connects with a liquid supply pipe 32 mounted on the piston 23, which pipe 32 has on its end a slide 33 which does not form part of the piston proper and consists of a short and externally cylindrical sliding member preferably of considerably smaller diameter than the piston. Fig. 3 shows how the liquid supply pipe 32 is secured to the piston 23 by a bolt 32'.

The slide 33 consists of a short and externally cylindrical pipe or sliding member which is closed at its outer end and has an internal cavity situated in continuation of the liquid supply pipe 32. In the slide 33 there are two diametrically oppositely placed liquid outlets 34, only one of which appears in the drawing, which during the motion of the slide will register with liquid passage openings 35, which are disposed in two diametrically oppositely placed rows in a tubular slide guide 36. The tubular slide guide 36 has on its outer side a number of ring collars 37, Fig. 3, which together with the outer surface of the slide guide 36 and a tubular jacket 38 fitted around the ring collars 37 bound a number of ring-shaped chambers 39. The chambers 39 are provided with outlet ports by openings in the jacket 38. The liquid released from the chambers flows through pipes 40 (Figs. 1, 2, and 3) to rinsing liquid nozzles 41 in the chamber 1, Fig. 1. The said nozzles 41 or other liquid ejection openings may consist of groups of nozzles or groups of ejection openings.

Two ring chambers 42 at the ends of the slide guide 36, respectively, have such length that with these end chambers 42 register two liquid passage openings 35 in the slide guide 36. The end chambers 42 form drains for liquid under pressure which when the slide 33 is near or at one of its end positions, flows from the slide 33 through the end chambers 42 and through the outlets of the latter in the jacket 38 to outflow pipes 43, which as shown in Fig. 2 are placed on either side of the pipes 40. The outflow pipes 43 terminate at the bottom of the chamber 1 in Fig. 1 but are for the sake of clarity not shown in this figure.

As shown in Figs. 2 and 4 the liquid supply pipe 32 for the slide 33 is disposed parallel to the axis of the piston 23 and the valve spindle 14 for the automatic valve 12. Fig. 4 shows that the end of the valve spindle 14 is screwed into or otherwise connected to an extension part 44 which projects into a cavity in the piston 23 and there terminates in a head 45. Between the latter and the plate which closes the cavity in the piston 23 a spring 46 is inserted which, when the piston 23 is in its inward position, serves to keep the valve 12 pressed against the seat 13. On the extension part 44 there is a radial pin 47 serving as a short handle by means of which the valve spindle 14 may be manually displaced somewhat to the right in Fig. 4, overcoming the pressure of the spring 46 so that the valve 12 is moved off of the seat 13.

On the outer end of the piston 23, there is mounted a toothed rack 48 parallel to the axis of the piston 23 as shown in Fig. 2. The rack 48 meshes with a gear 49 which is mounted on a concentric gear 50, which meshes with the gear 9 formerly mentioned, so that the spring 8 shown in Fig. 1 is tensioned, when the piston 23 and the rack 48 are moved to the right as shown in Fig. 2. The rack 48 is provided with radially projecting arms 51 which through springs 52 are connected to radially projecting arms 53 on the container 22.

The cleaning liquid nozzles 30 and the rinsing nozzles 41 respectively or the groups of nozzles or ejection openings corresponding to these nozzles need not, the machine having a rotatory carrying frame for the dishes, control the whole of the inner space in the chamber 1, it being sufficient that the nozzles 30 and the nozzles 41 respectively together control e. g. half of a section through the chamber. The zone controlled by the nozzles need not form a coherent surface.

The machine shown and described functions in the following way.

When the soiled dishes have been placed on the carrying frame 4 the chamber 1 is closed and a new cleaning medium cartridge may be placed in the container 26, Fig. 1. The three-way cock 17 is turned so that communication is effected only between the pipe 16, Fig. 2, and the pipe 18 to the pressure chamber 21 behind the piston 23. Next the pin or handle 47 of the valve spindle 14 is manually moved somewhat to the right as shown in Figs. 2 and 4, whereby the valve 12 is raised from its seat 13. From the supply piping 10 liquid under pressure, preferably water from a house water main, will now flow to the pipe 16 and through the three-way cock 17 and the pipe 18 to the pressure chamber 21 in the container 22. This causes the piston 23 to move outwardly in the container 22, which gives rise to a corresponding motion of the valve 12, the slide 33 and the rack 48. If the pressure is not sufficiently large, mechanical means may be fitted to make up for the lack in pressure. During the outward movement of the piston 23, the springs 52 are tensioned, Fig. 2, and the helical spring 8, Fig. 1, surrounding the spindle 39 is tensioned, as, the gear 9 is rotated by the rack 48. The upper part of the claw coupling 7 is thereby rotated in relation to its lower part on the spindle 5 for the carrying frame 4. The outward travel of the piston 23 ceases when the gear wheel 49, Fig. 2 meets the end of the row of teeth on the rack 48 nearest the piston 23.

When the piston 23 is in its extreme outward position, the three-way cock 17 is turned so that pipe 18 is closed and communication is established between the liquid supply pipe 16 and the pipe 20 to the cleaning medium container 26, from which the liquid flows to the ejection nozzles 30, so that in the chamber 1 a fog of cleaning liquid is formed at any rate in zones which together control at least half of a cross section in the chamber 1. At the same time the springs 52, Fig. 2 will move the piston 23 inwardly. The velocity of movement of the piston 23 is regulated by means of the valve 25 on the drain pipe 24. Simultaneously with the inward movement of the piston 23 the helical spring 8, Fig. 1 turns the spindle part 99 and, through the engaged parts of the coupling 7, turns the spindle 5 and the carrying frame 4 with the dishes. The carrying frame 4 is thus turned a number of times before the piston 23 reaches its innermost position in the container 22. Simultaneously with the piston 23 reaching its innermost position, the valve 12 will automatically be pressed against the valve seat 13 under the stress of the spring 46, Fig. 4.

Next a new outward travel of the piston 23 is commenced, the three-way cock 17 being set so as to close pipe 20 and to effect communication between the pipe 16 and the pipe 18 to the pressure space 21, after which the valve 12 is moved from its seat 13 by being actuated by the pin or the handle 47 on the valve spindle 14. The piston 23 is thereby displaced to its outermost position tensioning the springs 52 and 8.

When the piston is in its extreme outward position, the three-way cock 17 is turned so that pipe 18 is closed and communication is established between the liquid supply pipe 16 and the pipe 19 to the liquid supply pipe 32 of the slide 33. Through the pipe 32 the water under pressure flows to the slide 33 and through the outlets 34 through the openings 35 to the ring chambers 39. From these chambers 39 the water flows through the pipes 40, Figs. 1 and 2 to the rinsing nozzles 41. Only one nozzle or group of nozzles 41 is active at any one time, since only one ring chamber 39 and only one of the rinsing liquid pipes 40 are supplied with water by the slide 33 at any one time. Simultaneously with the inward movement of the piston 23 the spring 8, Fig. 1, as above explained, turns the carrying frame 4 with the dishes, so that the latter are rinsed by means of jets or fog jets of rinsing water ejected from the nozzles or groups of nozzles 41. As only one nozzle or group of nozzles 41 is active at any one time, this action is effected with the total amount of pressure exerted on the ejected water, e. g. with practically speaking the full pressure from a house water main.

In the extreme positions of the slide 33 the outlets 34 of the slide 33 will register with the openings 35 at the ends of the guide 36 which communicate with the end chambers 42, Figs. 2 and 3, and the inflowing water under pressure will be discharged through the pipes 43. As the slide guide 36 is open at its ends, water under pressure which may leak out between the slide 33 and the slide guide 36 and which might not pass through openings 35 in the slide guide 36 will run down to the horizontal wall 80, which separates the dish-washing space or chamber 1 from the space or chamber containing the liquid control arrangement. There may be provided through the wall 80 a passage opening or an outlet pipe for pressure water, which may escape from the slide guide 36.

The invention is not limited to the embodiment of the machine shown in Figs. 1–4 and described above.

By way of example the valve 12 need only have the spindle 14 guided for rectilinear motion, while at the same time between the piston 23 and the valve spindle 14 there may be such a connection that during its return motion the piston 23 directly or indirectly causes such a displacement of the valve spindle 14 that thereby the valve 12 is moved towards and pressed against its seat 13. The opening of the valve 12 and the displacement of the spindle 14 corresponding thereto can on the other hand be wholly or partly independent of the outward motion of the piston 23. The valve spindle 14 can be moved to the right in Figs. 2 and 4 either by a pull performed only on the spindle 14 or in other ways. If the valve spindle 14 is indirectly connected to the piston 23, e. g., as shown in Fig. 5 the valve 12 can be opened, e. g., by the introduction of liquid under pressure into the container 22 through another pipe than the pipe 18 shown in Fig. 2, such as a special pipe provided with a cock and connected with the container 22, so that by opening the cock on the said special pipe the piston 23 can be moved outwardly and thereby the valve 12 be opened. Such a special pipe 81 provided with a cock 99' is shown in Fig. 5.

In the embodiment of the machine shown in Figs. 1–4 the slide 33 is directly connected to the piston 23, which also applies to the valve 12 and the toothed rack 48. This is not necessary, as between the piston 23 and the liquid supply pipe 32 an intermediate member may be inserted, e. g., a lever or a toothed sector, so that a certain motion of the piston 23 gives rise to a longitudinal motion, different from the former motion of the slide 33, the motion of which can take place in another direction than the motion of the piston 23. Correspondingly there may between the piston 23 and the toothed rack 48 be inserted intermediate members, like those mentioned above, so that also the motion of the toothed rack 48 can get another size and direction than the motion of the piston 23. The same may be the case with the valve spindle 14 and thereby with the valve 12. The possibilities mentioned above will be explained below in connection with Fig. 5.

Fig. 5 shows schematically and partly in section a modified embodiment of the driving arrangement for the main members of the machine moved by the piston 23. In Fig. 5 corresponding parts are designated with the same reference designations as in Figs. 1–4. On the end of the piston 23 there are two outwardly-projecting rods 82 and 83, having radially projecting pins 84 and 85, respectively. Around the pin 84 engages a fork on a double-armed lever 86 which is pivoted on a stationary spindle 87, and the other end of which engages around a radial pin 88 on the liquid supply pipe 32, which is provided with a liquid supply means similar to the pipes 19, and 31 in Fig. 3. During the movement of the piston 23 the slide 33 will be moved, and this movement of slide 33 can, by suitably shaping and mounting the intermediate link 86, be made to differ in amount and direction from the movement of the piston 23.

In a similar way the short toothed rack 48 shown in Fig. 5, which is mounted for reciprocating movement, may by means of a double-armed lever 89, which is pivoted on a stationary spindle 93 and has fork ends engaging the pins 85 and 91 on the rod 83 and the toothed rack 48 respectively, be given reciprocating movement differing in amount and direction from the movement of the piston 23.

Also the valve 12 shown in Fig. 5 in the liquid supply pipes 10, 15, 16, such as are shown in Fig. 2, may be moved by the piston 23 in Fig. 5 in a way similar to the slide 33 and the toothed rack 48, i. e., by means of a pivoted lever similar to the lever 89, the outer fork end of which is engaged around a radial pin 92 on the valve spindle 14 guided for rectilinear motion instead of, as shown in Fig. 5, engaging around the transverse pin 91 on the toothed rack 48. In the embodiment shown in Fig. 5 the valve 12 and the spindle 14 are moved indirectly by the piston 23 through the toothed rack 48 and only during part of the reciprocating motion of the toothed rack 48. On the toothed rack 48 there is a transverse pin 94, which in Fig. 5 is seen engaging with a fork 95 on a short lever 96 which is pivoted around a spindle 97 and the other, fork-shaped end of which engages around the transverse pin 92 on the valve spindle 14. The prongs of the fork 95 are of unequal lengths. The lever 96 is shown nearly in its middle position, the piston 23 being likewise shown nearly in its middle position. When the piston 23 is situated in its innermost position and starting its outward travel, the levers 89 and 96 will be in such positions of rotation that the toothed rack 48 will be in its lowest position in Fig. 5, while at the same time the valve 12 abuts on the seat 13.

In this position of the piston 23 and valve 12 the right end of the lever 96 will be directed obliquely downwards in Fig. 5. During the commencing travel outwards of the piston 23, the lever 96 will be turned counterclockwise and the valve 12 thereby be opened, the toothed rack 48 being moved upwards in Fig. 5. The said upward motion of the toothed rack 48 and the opening of the valve 12 caused thereby may be effected by a momentary admission of liquid under pressure into the container 22 through opening of the cock 98' on the special pressure liquid pipe 81. When the toothed rack 48 has moved so far upwards in Fig. 5 that the pin 94 gets clear of the short prong on the fork 95, the valve 12 will be in its maximum open position and remain in this irrespective of the fact that the toothed rack 48 continues its upward motion which lasts until the piston 23 reaches its outermost position. When the pin 94 clears the short prong of the fork 95, the lever 96 will from its starting position be turned between 60° and 90° counter-clockwise and will consequently be in this position, when the piston 23 has arrived in its outermost position. During the return motion of the piston 23 the toothed rack 48 will be moved downwardly in Fig. 5, and the transverse pin 94 will during the last part of the downward motion of the toothed rack 48 pass the short prong of the fork 95 and abut on the long prong of the fork 95, so that the lever 96 is turned clockwise and back into its starting position, in which the valve 12 will be brought to abut on the valve seat 13, and the liquid supply 10, 15, 16 to the valve 33 thereby be interrupted, the valve 12 closing the annular liquid passage 15.

Also in the embodiment shown in Fig. 5 the opening of the valve 12 may be performed mechanically, by the lever 96 having a handle, by which the lever 96 can be turned from the position directed obliquely downwardly up into the position shown in Fig. 5 or even past the latter position. Irrespective of whether the opening of the valve 12 is performed mechanically, the valve 12 will also in the embodiment shown in Fig. 5 be closed by the piston 23 during the return motion of the latter.

I claim:

1. A valve control device for controlling sequential flow of liquid under pressure to a plurality of discharge ports in said device, the combination of a conduit for said liquid provided with a reciprocable valve for opening and closing said conduit; a cylinder; a piston reciprocable in said cylinder and yieldably connected with said valve; a second conduit connected with said cylinder; a flexible conduit connected at one end to said piston for reciprocation therewith and provided at its other end with means for supplying said liquid sequentially to a plurality of discharge parts; means for alternatively connecting said first conduit with said second conduit so that the liquid moves said piston in said cylinder in one direction, and with said flexible conduit so that said liquid flows through said parts; means for automatically returning said piston, after it has been moved by said liquid, said valve closing said first conduit when said piston is returned; and additional means for moving said valve to open said first conduit.

2. A valve control device for controlling sequential flow of liquid under pressure to a plurality of discharge ports in said device, the combination of a conduit for said liquid provided with a reciprocable valve for opening and closing said conduit; a cylinder; a piston reciprocable in said cylinder; a member mounted on said piston for closing said conduit by said valve; a second conduit connected with said cylinder; a flexible conduit connected at one end to said piston for reciprocation therewith and provided at its other end with means for supplying said liquid sequentially to a plurality of discharge ports; means for alternatively connecting said first conduit with said second conduit so that the liquid moves said piston in said cylinder in one direction, and with said flexible conduit so that said liquid flows through said ports; means for automatically returning said piston, after it has been moved by said liquid, said valve closing said first conduit when said piston is returned; and additional means for moving said valve to open said first conduit.

3. A valve control device for controlling sequential flow of liquid under pressure to a plurality of discharge ports in said device, the combination of a conduit for said liquid provided with a reciprocable valve for opening and closing said conduit; a cylinder; a piston reciprocable in said cylinder; a member mounted on said piston for closing said conduit by said valve; a second conduit connected with said cylinder; a third conduit comprising a flexible pipe and a rigid pipe mounted on said piston for reciprocation therewith, and provided with means for supplying said liquid sequentially to a plurality of discharge ports; means for alternatively connecting said first conduit with said second conduit so that the liquid moves said piston in said cylinder in one direction, and with said third conduit so that said liquid flows through said ports; means for automatically returning said piston, after it has been moved by said liquid, said valve closing said first conduit when said piston is returned; and additional means for moving said valve to open said first conduit.

4. A valve control device for controlling sequential flow of liquid under pressure to a plurality of discharge ports in said device, the combination of a conduit for said liquid provided with a reciprocable valve for opening and closing said conduit; a cylinder; a reciprocable piston normally disposed toward the inner end of said cylinder; a member mounted on said piston for closing said conduit by said valve; a second conduit connected with said cylinder; a flexible conduit connected to said piston for reciprocation therewith and provided with means for supplying said liquid sequentially to a plurality of discharge ports; means for alternatively connecting said first conduit with said second conduit so that the liquid moves said piston toward the outer end of said cylinder, and with said flexible conduit so that said liquid flows through said ports; a controlled discharge conduit connected to said inner end of said cylinder for evacuating liquid discharged by the return of said piston when said first conduit is connected to said flexible conduit, and said member being constructed to cause said valve to be moved to close said first conduit during the last part of the return motion of the piston; and additional means for moving said valve to open said first conduit.

JÖRGEN HERTZ.

REFERENCES CITED

The following references are of record in the file of this patent:

UNITED STATES PATENTS

| Number | Name | Date |
|---|---|---|
| 1,598,238 | Brooks | Aug. 31, 1926 |
| 1,992,877 | Monthan | Feb. 26, 1935 |
| 2,372,205 | Hertz | Mar. 27, 1945 |